United States Patent [19]

Magee

[11] Patent Number: 4,650,279

[45] Date of Patent: Mar. 17, 1987

[54] FIBER OPTIC LENS

[75] Inventor: Robert J. Magee, Concord, Mass.

[73] Assignee: The Charles Stark Draper Laboratory, Inc., Cambridge, Mass.

[21] Appl. No.: 641,017

[22] Filed: Aug. 15, 1984

[51] Int. Cl.$^4$ ................................................ G02B 6/04
[52] U.S. Cl. ............................... 350/96.24; 350/96.10; 350/96.25; 350/409
[58] Field of Search ............... 350/96.25, 96.24, 96.27, 350/557, 558, 96.10, 409, 451

[56] References Cited

U.S. PATENT DOCUMENTS

| | | | |
|---|---|---|---|
| 3,215,029 | 11/1965 | Woodcock | 350/96.25 |
| 3,436,142 | 4/1969 | Siegmund et al. | 350/96.25 |
| 3,666,347 | 5/1972 | Kitano et al. | 350/96.25 X |
| 3,892,468 | 7/1975 | Duguay | 350/96.24 |
| 4,099,833 | 7/1978 | Tosswill | 350/96.25 |
| 4,189,207 | 2/1980 | Fisher et al. | 350/96.25 |
| 4,468,091 | 8/1984 | Schmadel et al. | 350/96.30 |
| 4,487,646 | 12/1984 | Murray et al. | 350/96.25 X |

OTHER PUBLICATIONS

Fowles G. R. *Introduction to Modern Optics*, 2nd Edition, Holt Rinehart and Winston, Inc., New York, (1975), pp. 296, 297.

*Primary Examiner*—John Lee
*Attorney, Agent, or Firm*—Joseph S. Iandiorio; William E. Noonan

[57] ABSTRACT

A fiber optic lens including: an input aperture; an output aperture; and a fiber optic array interconnecting the input and output apertures, including multiplicity of single mode fiber optic elements of equal optical path length for transmitting light rays in-phase from the input aperture to the output aperture; the fiber optic elements are interconnected at the same relative location at each aperture for receiving the wave front at the input aperture and producing an image at the focal point of the output aperture and having a diffraction limit which is a function of the diameter of the entire fiber optic array.

7 Claims, 10 Drawing Figures

4,650,279

FIBER OPTIC LENS

FIELD OF INVENTION

This invention relates to a fiber optic lens, and more particularly to a fiber optic lens for transforming a wavefront into an image with diffraction limited resolution.

BACKGROUND OF INVENTION

Presently, diffraction limited images are formed with high quality mirrors and lenses which have been carefully designed and constructed. Diffraction limited refers to the fact that no matter how high the precision, the best resolution obtainable is limited by diffraction effects according to the expression $\alpha = 1.2\lambda/D$, where $\lambda$ is the wavelength of light, D is the diameter of the aperture and $\alpha$ is the smallest resolvable angle. Diffraction limited optics involve a number of problems. The surfaces of all optical elements in the system must be accurate to within a fraction of the wavelength of the light propagated. Similar accuracy is required in the positioning of the optical elements in the range of thousandths of an inch as a function of f/number. Decentering tolerances of the elements are small too, on the order of milliradians and thousandths of an inch. Such aberration tolerances limit the f/number and speed as well as field of view. While fiber optic devices have been used in many applications, such as image relaying, magnifying and light transmission, they have been less than successful in high resolution systems because they do not provide adequate in-phase transfer, diffraction limited resolution levels and focussing. Resolution in such devices is normally limited by the diameter of the fiber optic elements, not the whole array. High resolution is particularly desirable in astronomical telescopes, where spaced base line telescopes have been used to increase the size of D and therefore improve the resolution angle $\alpha$. However, these are radio telescopes, not light telescopes, because it is too difficult to properly transport two separate light images back to a common point from the spaced locations and merge them into a single image. When radio telescopes are used some resolution is inherently sacrificed because the radio wavelengths are much longer than those of light and so the angle of resolution $\alpha$ is correspondingly larger.

SUMMARY OF THE INVENTION

It is therefore an object of this invention to provide a fiber optic lens for transforming a wavefront to an image at the focal point of the lens.

It is a further object of this invention to provide such a fiber optic lens which is diffraction limited.

It is a further object of this invention to provide such a fiber optic lens in which all the optical path lengths are the same and the transmitted light bears a fixed phase relation with the incident light.

It is a further object of this invention to provide such a fiber optic lens in which the diffraction limit is a function of the diameter of the entire array of fiber optic elements.

It is a further object of this invention to provide such a fiber optic lens in which the fiber optic elements need only be accurately positioned at the input and output apertures.

It is a further object of this invention to provide such a fiber optic lens in which a planar entrance aperture may be used which eliminates the usual aberrations.

This invention results from the realization that a truly effective fiber optic lens can be made which is diffraction limited as a function of the diameter of the entire array and in which light from all fiber optic elements is in phase, by using an array of single mode fiber optic elements which transform a wavefront to an image.

This invention features a fiber optic lens including an input aperture, an output aperture, and a fiber optic array interconnecting the input and output apertures. The fiber optic array includes a multiplicity of single mode fiber optic elements of equal optical path length for transmitting the light rays in-phase from the input aperture to the output aperture. The fiber optic elements are interconnected at the same relative location at each aperture. The fiber optic lens receives a wavefront at the input aperture and produces an image at the focal point of the output aperture with a diffraction limit which is a function of the diameter of the entire fiber optic array.

In preferred embodiments the fiber optic lens has an f/number which equals the ratio of the radius of curvature of the output aperture to the diameter of the output aperture. The fiber optic elements are arranged at each aperture in an irregular pattern. There are means for stressing a fiber optic element to induce a change in its optical length. The input aperture may be planar and the output aperture curved, and the radius of the curvature of the output aperture may be equal to its focal length.

BRIEF DESCRIPTION OF THE DRAWING

Other objects, features and advantages will occur from the following description of a preferred embodiment and the accompanying drawings, in which.

DISCLOSURE OF THE PREFERRED EMBODIMENT

Figure 1:
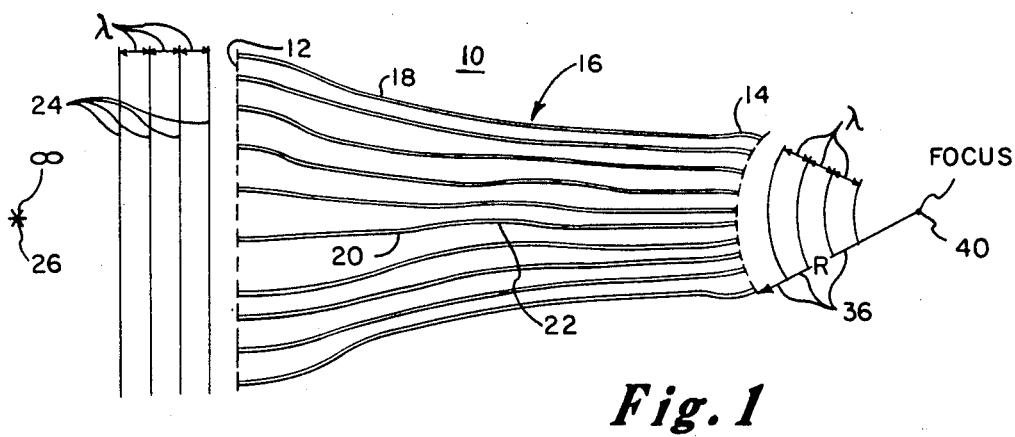
FIG. 1 is a schematic diagram of a fiber optic lens according to this invention with flat input aperture and curved output aperture.

There is shown in FIG. 1 a fiber optic lens 10 according to this invention having a flat input aperture 12 and a curved output aperture 14 interconnected by a multiplicity or bundle of fiber optic elements 16. All the fiber optic elements are of the same length and have the same optical path length: the entire fiber optic lens 10 functions as a conventional lens in which all light transmitted propagates over the same optical path length. Thus fiber optic element 18 on the outside of bundle 16, where the distance from the end of aperture 12 to the end of aperture 14 is relatively longer, is the same length as fiber optic element 20 in the center of the bundle, where the distance between aperture 12 and aperture 14 is somewhat shorter. The curved portion 22 of fiber optic element 20 is shown to illustrate the manner in which the extra length is accommodated.

While the input aperture 12 and output aperture 14 should be carefully formed, the distance between them and the orientation of them relative to each other is not critical since no matter what their orientation or the actual distance between them, the optical path length will remain the same so long as the fiber optic elements of fiber optic bundle or array 16 have their path length unchanged. This eliminates many of the problems which plague larger components such as used in astronomical telescopes. The support of fiber optic array 16 is not critical; it is only necessary insofar as the individual fibers require it to prevent them from being strained and broken; their particular disposition between apertures 12 and 14 is not critical. It is preferred that they be interconnected with the input aperture 12 in a random pattern rather than an ordered matrix, for example, to prevent the appearance of regular patterns in the image. Whatever the random pattern is at aperture 12, the same irregular pattern should be used at aperture 14 with each fiber optic element occupying the same relative position in aperture 14 as in aperture 12 so that the image is faithfully reproduced. The input aperture may be flat, especially when it is used to receive wavefronts of light 24 occurring at some predetermined wavelength λ coming from a distant object such as a stellar body 26 at infinity. When a flat aperture is used, such as aperture 12, the classical spherical abberation problem is eliminated.

Figure 2:
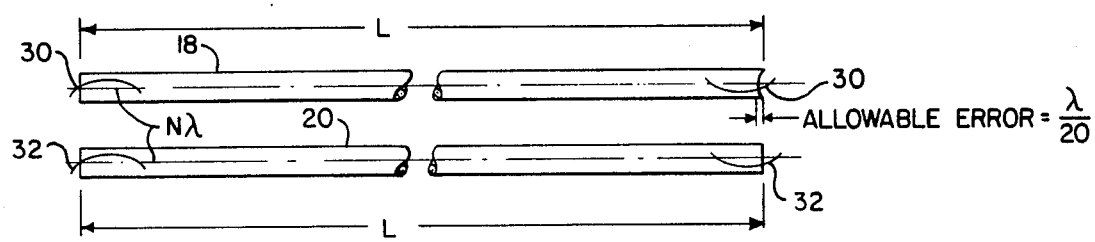
FIG. 2 is an enlarged view with portions broken away of two fiber optic elements showing the in-phase propagation of light.
Figure 3:
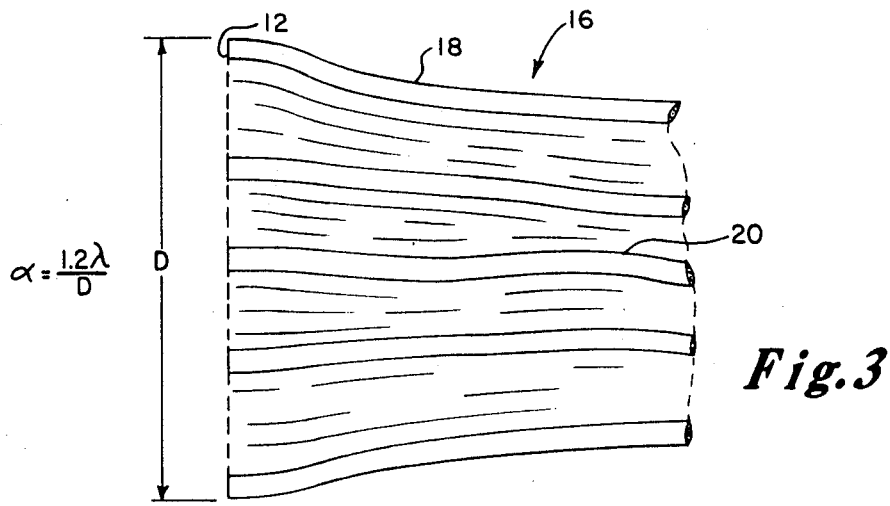
FIG. 3 is a schematic view of the input aperture of the fiber optic lens showing the diameter D which is determinative of the resolution of the fiber optic lens.
Figure 4:
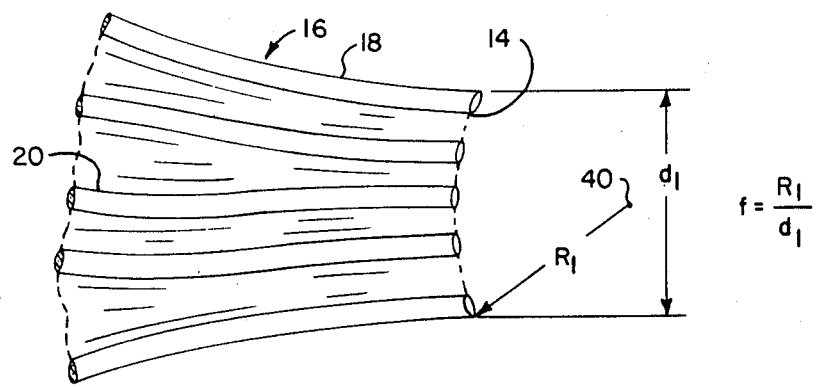
FIG. 4 is a schematic diagram of the output aperture of the fiber optic lens illustrating the radius of curvature and aperture diameter determinative of the f/number.
Figure 5:
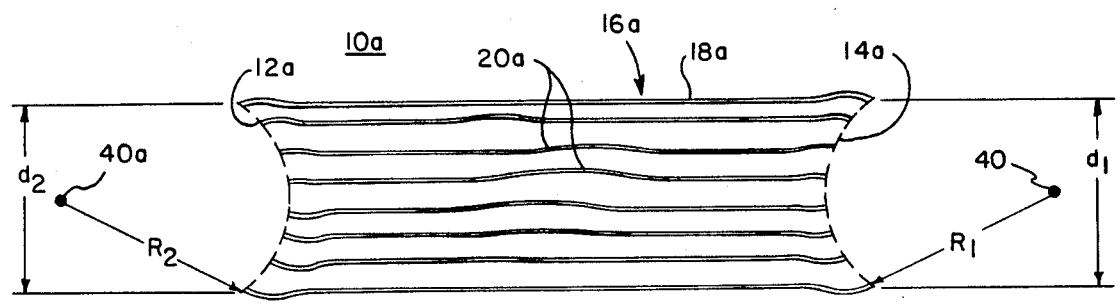
FIG. 5 is a fiber optic lens similar to that shown in FIG. 1 but having both its input and output apertures curved.
Figure 6:
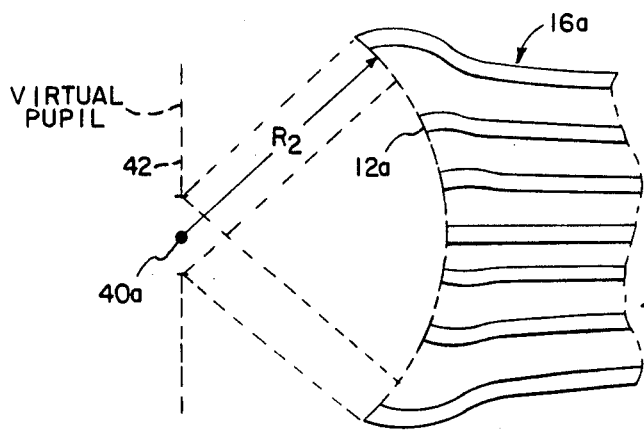
FIG. 6 is a schematic view showing the virtual pupil created by the highly selective numerical aperture of the fiber optic elements.

All the fiber optic elements 18, 20 in fiber optic array 16 are single mode so that the light entering bears a fixed phase relation with the light leaving. This is illustrated in FIG. 2, where two fiber optic elements 18, 20 are shown having equal length L and equal optical path length n, so that light waves 30, 32, entering in phase, will exit in phase. The incoming wavefronts 24 are thus transformed by fiber optic lens 10 into curved wavefronts 36, which are focussed at 40 to form a conventional image. The high resolution which results from the use of fiber optic lens 10 is a function of the fact that the diameter D used to determine the resolution is not that of an individual fiber optic element, but rather that of the entire optical array, as shown in FIG. 3. The f/number of output aperture 14 is calculated from the ratio of the radius of curvature $R_1$ of aperture 14, FIG. 4, to the diameter $d_1$ of that aperture. When objects to be viewed are closer than infinity, a curved input aperture 12a may be used with diameter $d_2$ and a radius of curvature $R_2$, FIG. 5, where the radius $R_1$ of output aperture 14a is not necessarily equal to the radius $R_2$ of input aperture 12a. The numerical aperture of the fiber optic elements in fiber optic array 16, FIG. 6, is in the neighborhood of 0.05, so that they have a high selectivity with a half angle of about 3 degrees. This creates a virtual entrance pupil 42 that allows a wide field of view.

Figure 7:
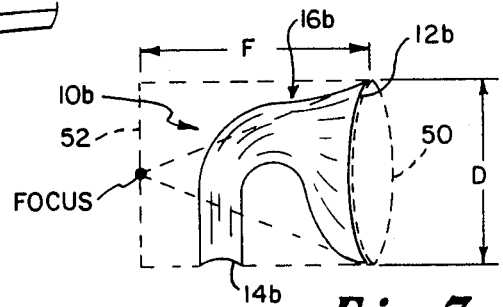
FIG. 7 is a diagram showing the relative reduction in size that can be effected using the fiber optic lens according to this invention.

The unique construction of the fiber optic lens according to this invention provides additional advantages. For example, a conventional lens 50 shown in phantom, FIG. 7, having an f/number of 1 and a diameter D, would typically have a focal length F equal to D, so that the lens would require a total mounting space 52, also shown in phantom, which is approximately cubical having its sides equal to F and D. However, using a fiber optic lens 10b according to this invention with fiber optic array 16b folded over between input aperture 12b and output aperture 14b, the focal length can be folded so that the size of the overall space required can be reduced as shown.

Figure 8:
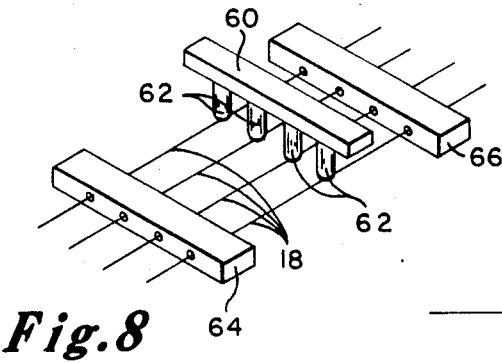
FIG. 8 is a diagrammatic axonometric view showing a mechanism for inducing stress in a fiber optic element according to this invention.
Figure 8A:
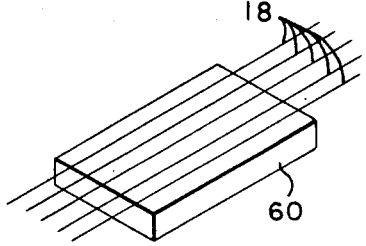
FIG. 8A is a diagrammatic axonometric view showing an alternative mechanism for inducing stress in a fiber optic element according to this invention.

In order to correct variations in optical path length of individual fibers or groups of fibers in the array, some means for inducing strain in the individual fibers 18, FIG. 8 may be used, such as a piezoelectric or magnetostrictive driven component 60 which selectively individually drives hammers 62 to stress fiber optic elements 18 where they are held between mounting blocks 64 and 66. This changes the optical path length of the fibers so stressed to adjust the phase relationships of the light waves propagated through the fibers. This can be done in order to remove any minor phase differences that may occur or to purposely induce phase shifts to vary at small angles, i.e. one or two degrees, the direction in which the input aperture is pointing to provide a scanning function at the rate of 10,000 cyc/sec. or more. A suitable piezoelectric device is quartz crystal or Rochelle salt. An alternative method of inducing a change in optical path length is to bond the fibers 18 directly to the piezoelectric or magnetostrictive element 60, FIG. 8A.

Figure 9:
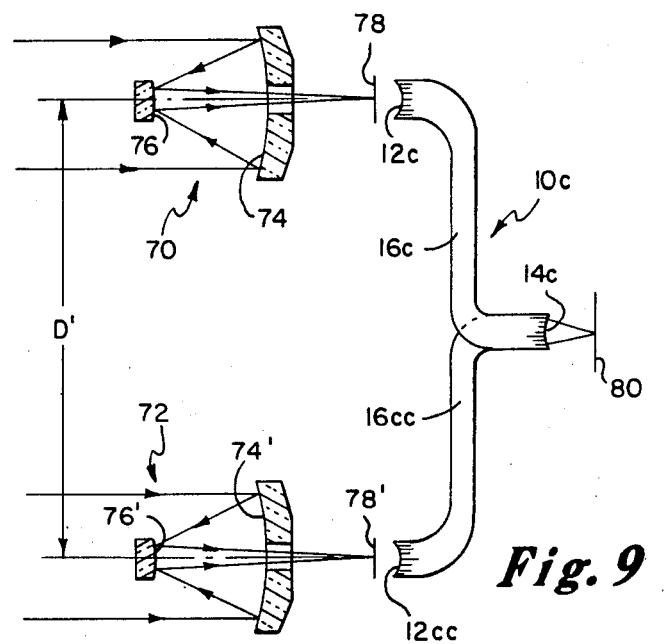
FIG. 9 is a schematic view of a conventional spaced base line astronomical telescope using a split fiber optic lens according to this invention.

The fiber optic lens of this invention makes it practical to construct a conventional split base line astronomical telescope for light waves using a construction heretofore used only for radio telescopes. Such a system, as shown in FIG. 9, employs two telescopes 70, 72, spaced apart by a substantial distance D'. Incoming stellar radiation strikes the first surface 74, which via the second surface 76 focusses the light rays on focal plane 78. Telescope 72 uses identical components 74', 76', to focus the radiation on focal plane 78'. Fiber optic lens 10c includes two fiber optic arrays 16c, 16cc, each of which interconnects with a separate input aperture 12c, 12cc, respectively, which receive the radiation from focal planes 78 and 78', respectively. The other ends of fiber optic arrays 16c and 16cc are merged and interconnect with a single output aperture 14c that produces a single combined image at focal plane 80. The use of the fiber optic arrays 16c and 16cc to transport the light image from input apertures 12c and 12cc to output aperture 14c eliminates the need for precisely positioning and orienting optical elements to project the light over long distances, which heretofore has made such apparatus impractical.

Other embodiments will occur to those skilled in the art and are in the following claims:

What is claimed is:

1. A fiber optic lens comprising:
an input aperture; an output aperture having a focal point; and a fiber optic array interconnecting said input and output apertures, including a multiplicity of single mode fiber optic elements of equal optical path length for transmitting light rays in-phase from said input aperture to said output aperture; said fiber optic elements being interconnected at the same relative location at each aperture, for receiving a wavefront at the input aperture and producing an image at the focal point of the output aperture, and said lens having a diffraction limit which is a function of the diameter of the fiber optic array.

2. The fiber optic lens of claim 1 in which said output aperture has a radius of curvature and a diameter and which has an f/number which equals the ratio of the radius of curvature of the output aperture to the diameter of the output aperture.

3. The fiber optic lens of claim 2 in which the radius of curvature is equal to the focal length.

4. The fiber optic lens of claim 1 in which said input aperture is planar.

5. The fiber optic lens of claim 1 in which said output aperture is curved.

6. A fiber optic lens comprising:
an input aperture; an output aperture having a focal point; and a fiber optic array interconnecting said input and output apertures, including a multiplicity of single mode fiber optic elements of equal optical path length for transmitting light rays in-phase from said input aperture to said output aperture; said fiber optic elements being interconnected in an irregular pattern at the same relative location at each aperture, for receiving a wavefront at the input aperture and producing an image at the focal point of the output aperture, and said lens having a diffraction limit which is a function of the diameter of the fiber optic array.

7. A fiber optic lens comprising:
an input aperture; an output aperture having a focal point; a fiber optic array interconnecting said input and output apertures, including a multiplicity of a single mode fiber optic elements of equal optical path length for transmitting light rays in-phase from said input aperture to said output aperture; and means for straining a fiber optic element to induce a change in optical path length; said fiber optic elements being interconnected at the same relative location at each aperture, for receiving a wavefront at the input aperture and producing an image at the focal point of the output aperture, and said lens having a diffraction limit which is a function of the diameter of the fiber optic array.

* * * * *